(12) United States Patent
Ozawa

(10) Patent No.: US 6,246,051 B1
(45) Date of Patent: Jun. 12, 2001

(54) LIGHT BEAM SCANNING DEVICE HAVING A COLLIMATING LENS WITH A ROTATING MECHANISM

(75) Inventor: Takeshi Ozawa, Nagano (JP)

(73) Assignee: Kabushiki Kaisha Sankyo Seiki Seisakusho, Nagano (JP)

( * ) Notice: Subject to any disclaimer, the term of this patent is extended or adjusted under 35 U.S.C. 154(b) by 0 days.

(21) Appl. No.: 09/327,540

(22) Filed: Jun. 8, 1999

(30) Foreign Application Priority Data

Jun. 8, 1998 (JP) .................................................. 10-158269

(51) Int. Cl.$^7$ ........................................................ H01J 3/14
(52) U.S. Cl. ............................................. 250/234; 250/216
(58) Field of Search ..................................... 250/234, 236, 250/239, 216; 359/210, 213, 216; 257/81, 431–435

(56) References Cited

U.S. PATENT DOCUMENTS 5,498,869 * 3/1996 Appel et al. ......................... 250/236

FOREIGN PATENT DOCUMENTS

| 35 31 666 A1 | 3/1987 | (DE) . |
| 196 26 298 A1 | 1/1998 | (DE) . |
| 0 249 642 A1 | 12/1987 | (EP) . |
| 0 935 142 A2 | 8/1999 | (EP) . |
| 9-274076 | 10/1997 | (JP) . |

OTHER PUBLICATIONS

Japanese Abstract No. 61–175614, dated Aug. 7, 1986.

* cited by examiner

*Primary Examiner*—Que T. Le
(74) *Attorney, Agent, or Firm*—Sughrue, Mion, Zinn, Macpeak & Seas, PLLC

(57) ABSTRACT

A light beam scanning device 1 has: a laser unit 4 which is placed at a fixed position; a collimating lens 5 which is placed in front of the laser unit; and a swinging mechanism 6 of the magnetic driving type which laterally swings the collimating lens 5. The rotational angle position of the lens due to the swinging mechanism 6 is detected on the basis of an output of a Hall element 97 which detects the origin of the rotational position of a rotor 92 of the swinging mechanism 6. Based on the detection, the light emitting timing of the laser unit 4 is feedback controlled. The lens 5 is directly swung so as to laterally swing the laser beam. As compared with a device of a prior art which uses a reflector plate or a polygon mirror, the present device can be compactly configured in a miniature size.

16 Claims, 6 Drawing Sheets

LIGHT BEAM SCANNING DEVICE HAVING A COLLIMATING LENS WITH A ROTATING MECHANISM

BACKGROUND OF INVENTION

1. Field of the Invention

The present invention relates to a light beam scanning device which two-dimensionally scans an object region with a light beam such as a laser beam.

2. Related Art

As a device such as a vehicle gap measuring apparatus, known is an apparatus configured by: a light beam scanning device which two-dimensionally scans a certain measuring object region in front of the apparatus with a laser beam; a light receiving device which receives reflected light of the laser beam emitted from the light beam scanning device; and a calculation device which calculates a vehicle gap on the basis of a light receiving state in the light receiving device. For example, Unexamined Japanese Patent Publication Hei.9-274076 discloses such a vehicle gap measuring apparatus.

A light beam scanning device of the conventional art which is used in a vehicle gap measuring apparatus is structured in the following manner. Pulse light from a light source such as a laser diode is passed through a collimating lens to be emitted as a light beam. The light beam impinges on light deflecting means which is swung in a constant angle range, specifically a reflector plate or a rotating polygon mirror. A measuring object region in front of the apparatus is two-dimensionally scanned by using a reflected beam from the means. In the vehicle gap measuring apparatus disclosed in the patent publication, for example, two-dimensional scanning of a light beam is conducted by using a polygon mirror.

As described above, in a light beam scanning device of the prior art, a light beam is deflected by swinging a reflector plate or rotating a polygon mirror, so as to conduct a scanning operation in a constant angle range. Deflecting means such as a reflector plate requires a larger installation space than other components. This largely impedes miniaturization of a light beam scanning device.

In a light beam scanning device of the prior art, irradiation of a light beam is pulsatingly conducted in synchronization with the scanning angle. When the irradiation (emission) timing of a light beam is shifted from the rotational angle position (scanning angle) of a reflector plate or a polygon mirror, there arises a disadvantage that it is impossible to scan the whole of a measuring object region without omission. In order to prevent such a disadvantage from occurring, conventionally, the reflector plate or the polygon mirror is driven while maintaining accurate linearity with respect to the irradiation timing of the light beam. Therefore, a mechanism for driving the reflector plate or the polygon mirror must be provided with positional accuracy of a high resolution.

SUMMARY OF INVENTION

In view of these problems, it is a first object of the invention to provide a small and compact light beam scanning device which can conduct scanning of a beam such as a laser beam in a constant angle range without requiring a reflector plate, a polygon mirror, or other light deflecting means.

It is a second object of the invention to provide a light beam scanning device which can adequately conduct scanning of a beam without using a driving mechanism provided with positional accuracy of a high resolution.

An aspect of the present invention, there is provided a light beam scanning device for scaning an object region in a predetermined direction with a light beam, comprising:

a light source emitting the light beam;

a collimating lens through which the light beam from said light source is allowed to pass; and a swinging mechanism swinging said collimating lens in a predetermined angle range, wherein a main optical axis of the light beam from said light source is positioned in a same plane as an optical axis of said collimating lens obtains when said collimating lens is swung, a swing center axis of said collimating lens due to said swinging mechanism is positioned on an extension of an optical axis of the light beam which is on a side of said light source with respect to said collimating lens, and said collimating lens is swung along the plane by said swinging mechanism.

As described above, in the light beam scanning device of the invention, the collimating lens is placed in front of the light source placed at a fixed position in the emission direction, and the collimating lens is directly swung in a constant angle range.

According to the invention, therefore, a reflector plate or a polygon mirror which is required in the prior art is not necessary, and hence the device can be compactly configured in a very small size.

The light source is placed at or in the vicinity of the swing center of the swinging mechanism and the lens which is driven by the mechanism. As compared with the configuration of the prior art in which a light source is placed outside a swing locus of a swinging mechanism having a reflector plate or a polygon mirror, therefore, the space required for placing such components can be reduced, and hence the whole of the device can be compactly configured in a further small size.

DETAILED DESCRIPTION OF PREFERRED EMBODIMENTS

Hereinafter, light beam scanning devices to which the invention is applied will be described with reference to the accompanying drawings.

First Embodiment

Figure 1A:
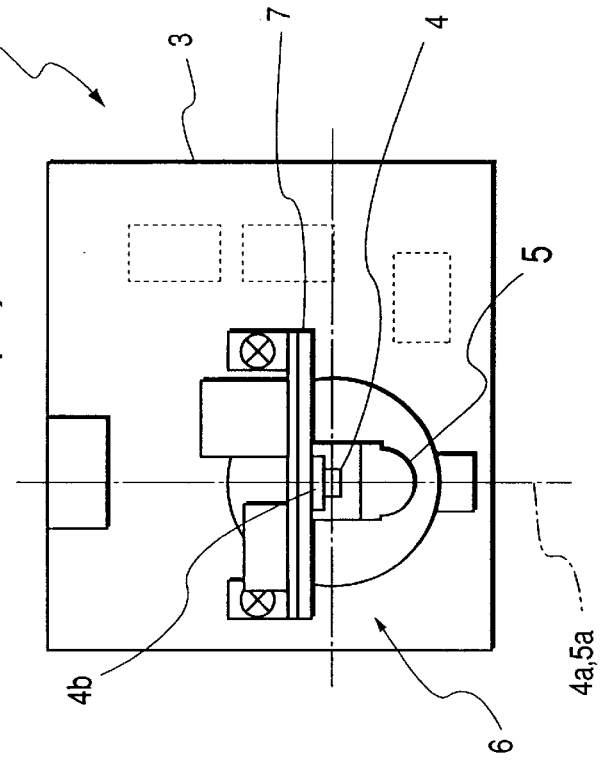
FIGS. 1(A) to 1(C) are a plan view, a front view, and a side view of main portions of a light beam scanning device to which the invention is applied, respectively.
Figure 1C:
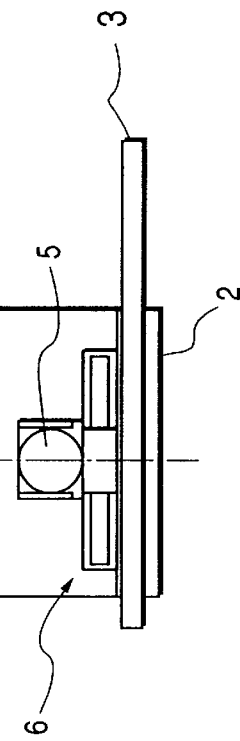
Figure 1B:
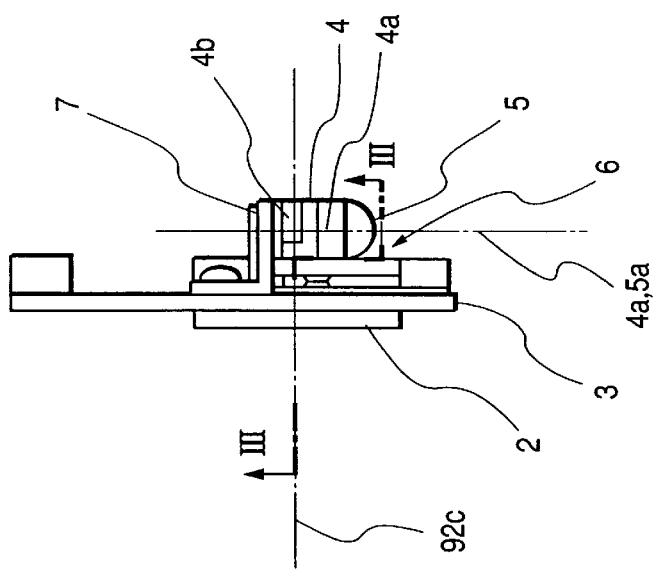

FIGS. 1(A) to 1(C) are a plan view, a front view, and a side view of main portions of a light beam scanning device which is suitably used in a vehicle gap measuring apparatus or the like, respectively. As shown in the figures, the light beam scanning device 1 of the embodiment has a rectangular support plate 2, and a circuit board 3 which is placed on the plate. On the circuit board 3, arranged are a laser unit 4, a collimating lens 5 which converts laser light emitted from the laser unit 4 into parallel beams to emit the beams as a laser beam, and a swinging mechanism 6 which swings the collimating lens 5.

Figure 2:
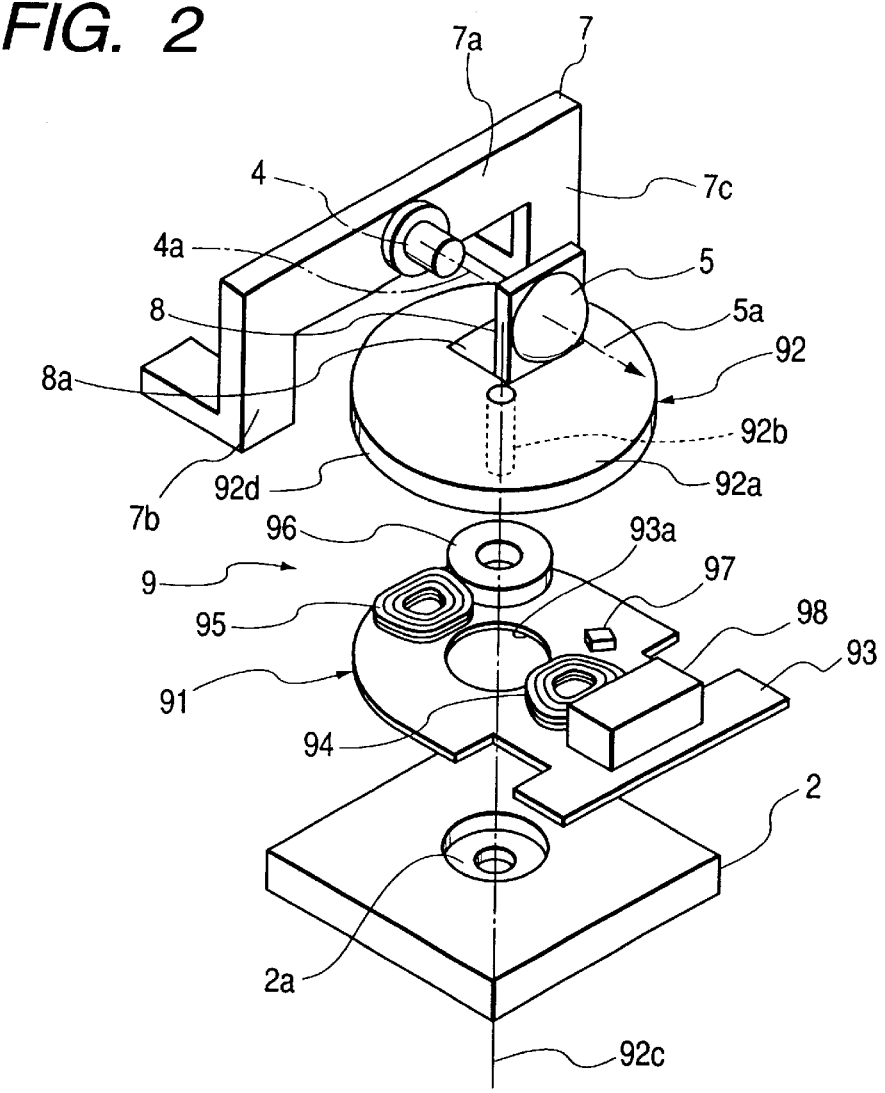
FIG. 2 is an exploded perspective view showing main portions of the light beam scanning device of FIG. 1 in which a circuit board is omitted.
Figure 3:
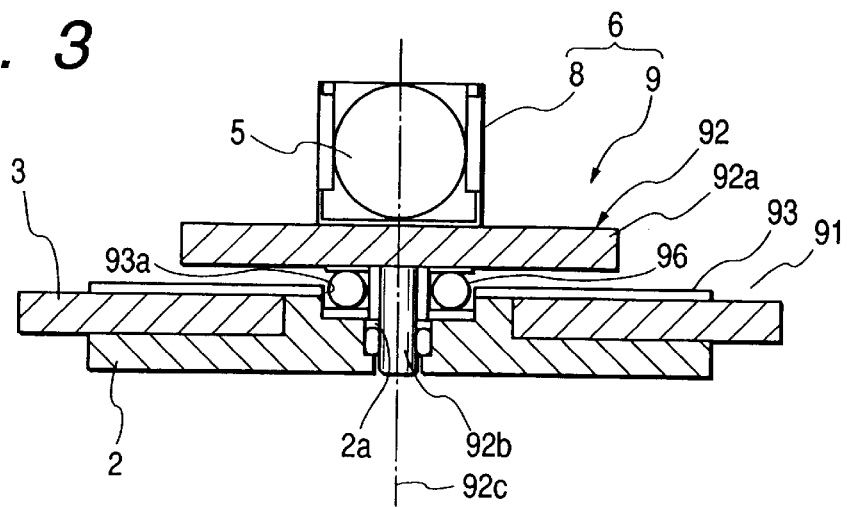
FIG. 3 is a section view taken along the line III—III of FIG. 1(B)

FIG. 2 is an exploded perspective view showing main portions of the light beam scanning device in which the circuit board 3 is omitted, and FIG. 3 is a section view taken along the line III—III of FIG. 1(B). Referring also to these figures, the configuration of components of the light beam scanning device 1 of the embodiment will be described.

The laser unit 4 is attached to a center position of a horizontal portion 7a of a portal support frame 7, so as to be directed in the forward direction. The main optical axis 4a of the laser unit is set to be horizontal. Lower end portions of both the legs 7b and 7c of the support frame 7 are rearward perpendicularly bent. The bent portions are fixed via the circuit board 3 to the support plate 2 disposed below the board, by means of fastening means such as screws. The collimating lens 5 is positioned in front of the laser unit 4. The optical axis 5a of the lens 5 is set to coincide with the main optical axis 4a of the laser unit 4, at the center position of swinging of the lens 5. When the lens 5 is swung as described later, therefore, the optical axis 5a of the lens 5 moves a horizontal plane containing the main optical axis 4a of the laser unit 4.

Next, the swinging mechanism 6 which swings the collimating lens 5 in a lateral direction or the scanning direction will be described. The swinging mechanism 6 has a lens support frame 8 which supports the collimating lens 5, and a magnetic driving mechanism 9 which laterally swings the lens support frame 8.

The magnetic driving mechanism 9 has a stator 91 and a rotor 92. The stator 91 comprises a yoke plate 93 which is attached to the upper face of the circuit board 3, and a pair of driving coils 94 and 95 which are arranged on the upper face of the circuit board 3 and in front and rear of a through hole 93a formed in the yoke plate 93, respectively. The rotor 92 has the disk-like rotor body 92a, and a rotation shaft 92b which downward perpendicularly protrudes from the center of the rear face of the rotor body 92a. A rotor magnet in which two sets of N and S poles are formed at intervals of 90 degrees is attached to the rear face of the rotor body 92a. Alternatively, one set of magnetic poles may be formed at intervals of 180 degrees.

In the support plate 2, a shaft hole 2a is formed at a position opposed to the through hole 93a of the yoke plate. The upper half portion of the shaft hole 2a has a larger diameter, and the lower half portion has a smaller diameter. As shown in FIG. 3, a thrust bearing 96 is fitted into the larger-diameter portion. The rotor 92 is supported on the support plate 2 by the thrust bearing 96 in a rotatable manner.

The center axis 92c of the rotor rotation shaft 92b serves as the swing center of the collimating lens 5 which is supported by the lens support frame 8 attached to the rotor. In the embodiment, as shown in FIG. 1, the swing center axis 92c passes the luminescent point 4b of the laser unit 4. The main optical axis 4a of the light emitted from the laser unit 4, and the lens optical axis 5a are in the same horizontal plane, and the swing center axis of the collimating lens coincides with the luminescent point 4b of the laser unit. Therefore, the collimating lens 5 can be laterally swung about the luminescent point 4b of the laser unit 4, in the horizontal plane perpendicular to the center axis 92c.

The magnetic driving mechanism 9 further comprises position detecting means for detecting the rotation position (swing position) of the rotor 92. Referring to FIG. 2, the position detecting means of the embodiment is configured by a Hall element 97 on the surface of the yoke plate 93 and opposed to the magnetized face of the rotor magnet disposed on the rear face of the rotor body 92a. The swing position of the rotor 92 is detected by using the Hall element 97. When the rotor 92 reaches the origin position which is the preset swing limit position, a pulse output indicative of this is obtained. In addition to the means, the embodiment further comprises speed controlling means for the rotor 92. The speed controlling means includes: an FG magnetized face (frequency generating magnetized face) 92d which is formed by alternatingly forming N and S poles in the outer peripheral face of the rotor body 92a at predetermined intervals; and detecting means 98 using a magnetoresistive element which is placed on the upper face of the yoke plate 93 and opposed to the FG magnetized face 92d.

Figure 4A:
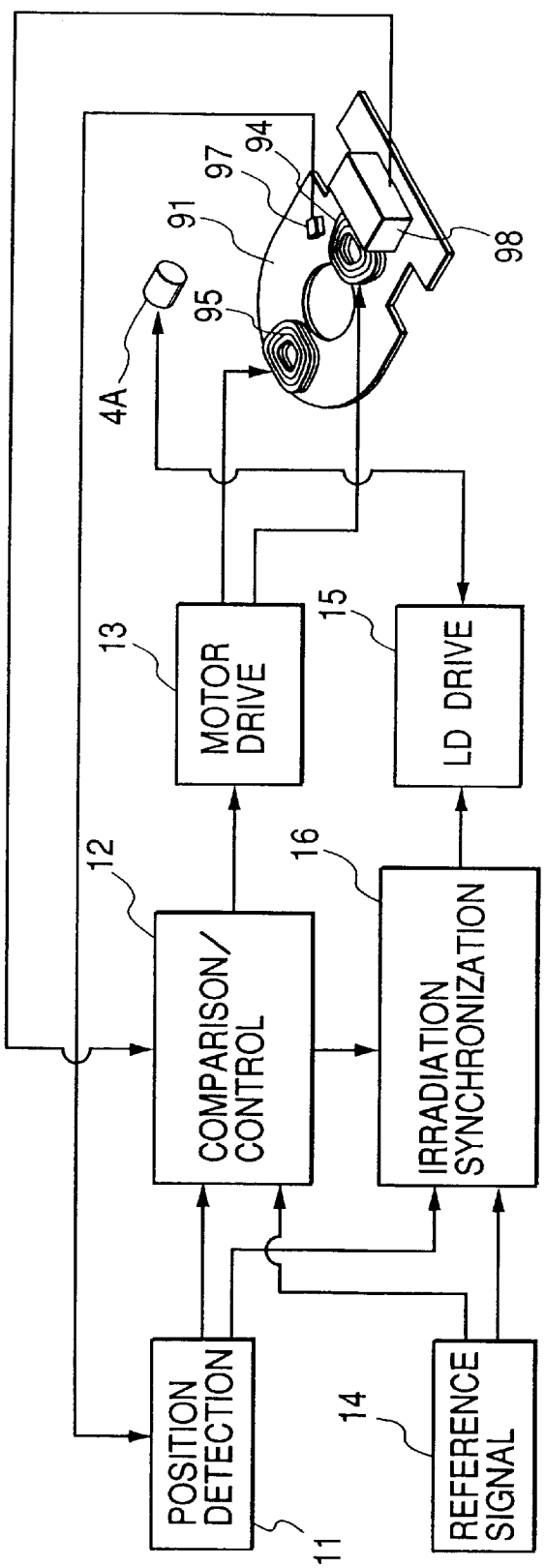
FIG. 4(A) is a schematic block diagram showing a driving system of the light beam scanning device of FIG. 1.
Figure 4B:
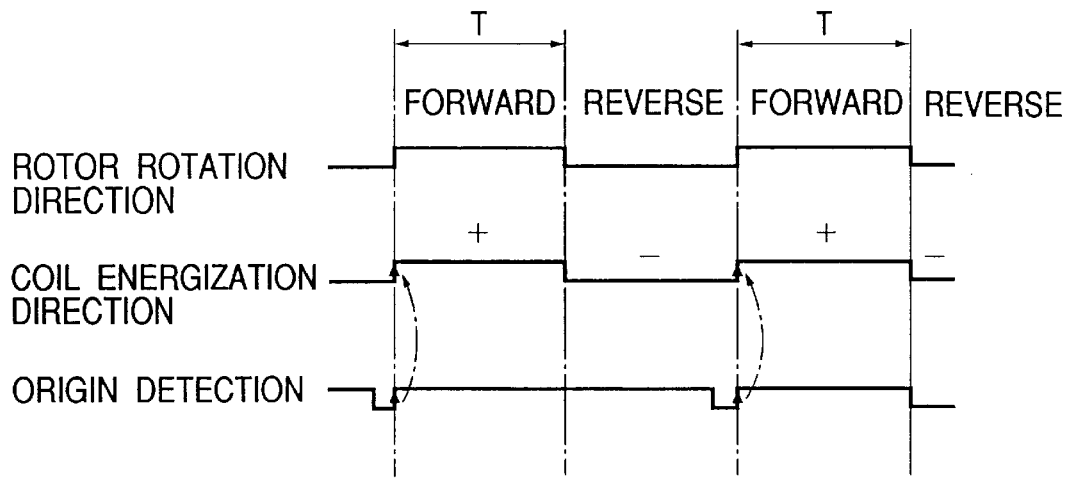
FIG. 4(B) is a timing chart schematically showing the operation of the system.

Next, the operation of the light beam scanning device 1 will be described. FIG. 4(A) is a schematic block diagram showing a driving system of the light beam scanning device 1 of the embodiment, and FIG. 4(B) is a timing chart schematically showing the operation of the system. Based on a detection signal of the Hall element 97, a position detection unit 11 detects whether the rotor 92 of the magnetic driving mechanism 9 reaches the origin position which is one of swing limit positions or not. A result of the detection is supplied to a comparison/control unit 12. In this unit, if it is detected that the rotor 92 returns to the origin position, the energization direction of the pair of driving coils 94 and 95 is inverted via a motor drive unit 13, so that the rotation of the rotor 92 is switched from the reverse to the forward, thereby inverting the swinging direction.

The comparison/control unit 12 measures the time period after the returning to the origin, on the basis of a reference clock signal supplied from a reference signal generation unit 14. At the timing when a predetermined time period T elapses, the energization direction of the pair of driving coils 94 and 95 is inverted via the motor drive unit 13, so that the rotation of the rotor 92 is switched from the forward to the reverse. Thereafter, the forward and the reverse of the rotor 92 are periodically switched over in a similar manner. As a result, the lens 5 which is supported on the rotor 92 is laterally swung about, for example, the main optical axis 4a of the laser unit 4 in a constant angle range.

At the same time, the comparison/control unit 12 controls also the speed of the rotor 92 based on a detection signal of the detecting means 98.

On the other hand, a laser diode 4A incorporated in the laser unit 4 is driven by an LD drive unit 15. Under the control of an irradiation synchronization control unit 16, the LD drive unit 15 drives the laser diode 4A of the laser unit 4 to intermittently emit laser light at a given timing. The light emission timing, i.e., the timing of irradiating the measuring object with a laser beam must be synchronized with the scanning angle of the collimating lens 5. Therefore, the reference clock signal supplied from a reference signal generation unit 14, a signal from the position detection unit 11 and indicative of the origin position (absolute position) of the lens, and a control signal from the comparison/control unit 12 are supplied to the irradiation synchronization control unit 16. The irradiation synchronization control unit 16 determines the irradiation timing on the basis of these signals.

As described above, in the light beam scanning device 1 of the embodiment, the collimating lens 5 placed in front of the laser unit 4 is directly laterally swung, so that the laser beam emitted through the collimating lens 5 is subjected to scanning in a lateral constant angle range, whereby the measuring object region is scanned.

Unlike a prior art mechanism in which a laser beam is subjected to scanning by using light deflecting means such as a reflector plate or a polygon mirror, therefore, such a reflector plate or a polygon mirror is not necessary, and hence the device can be compactly configured in a small size. The laser unit 4 is placed at the center of the swinging members such as the rotor 92, the lens support frame 8, and the collimating lens 5. As compared with a prior art mechanism in which a laser unit is placed outside a swing locus of a swinging member, therefore, the components can be placed in a smaller space. This also contributes to the small size and compactness of the device.

The synchronization between the light emission timing (irradiation timing) of the laser unit 4 and the scanning angle (rotational angle position) of the collimating lens 5 is attained by feedback controlling the light emission timing on the basis of the absolute position of the rotational angle of the collimating lens 5. Unlike the prior art, therefore, a driving mechanism of high linearity and provided with positional accuracy of a high resolution is not required, and there is no possibility that the synchronization between the light emission timing and the scanning angle is lost.

Modification of First Embodiment

In the embodiment described above, the single laser unit 4 is used. Alternatively, two or more laser units may be used. In the alternative, laser units may be vertically arranged in multiple stages, or plural laser units may be horizontally arranged, and collimating lenses may be placed in front of the laser units, respectively.

In the magnetic driving mechanism of the embodiment, the coil is placed on the stator and the magnet is placed on the rotor. Alternatively, they may be placed in an opposite manner.

Second Embodiment

Figure 5:
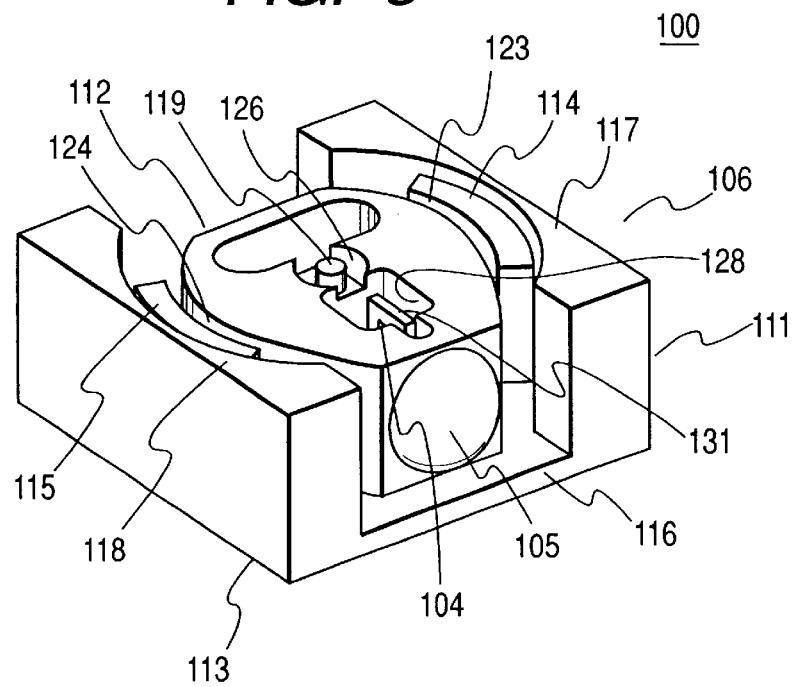
FIG. 5 is an external perspective view of a light beam scanning device of a second embodiment of the invention.

FIG. 5 is a perspective view showing main portions of another embodiment of the light beam scanning device of the invention. Also the light beam scanning device 100 shown in the figure has: a semiconductor laser chip 104 serving as a light source which is placed at a fixed position; a collimating lens 105 which is positioned in front of the semiconductor laser chip 104; and a swinging mechanism 106 which laterally swings the collimating lens 105.

Figure 6A:
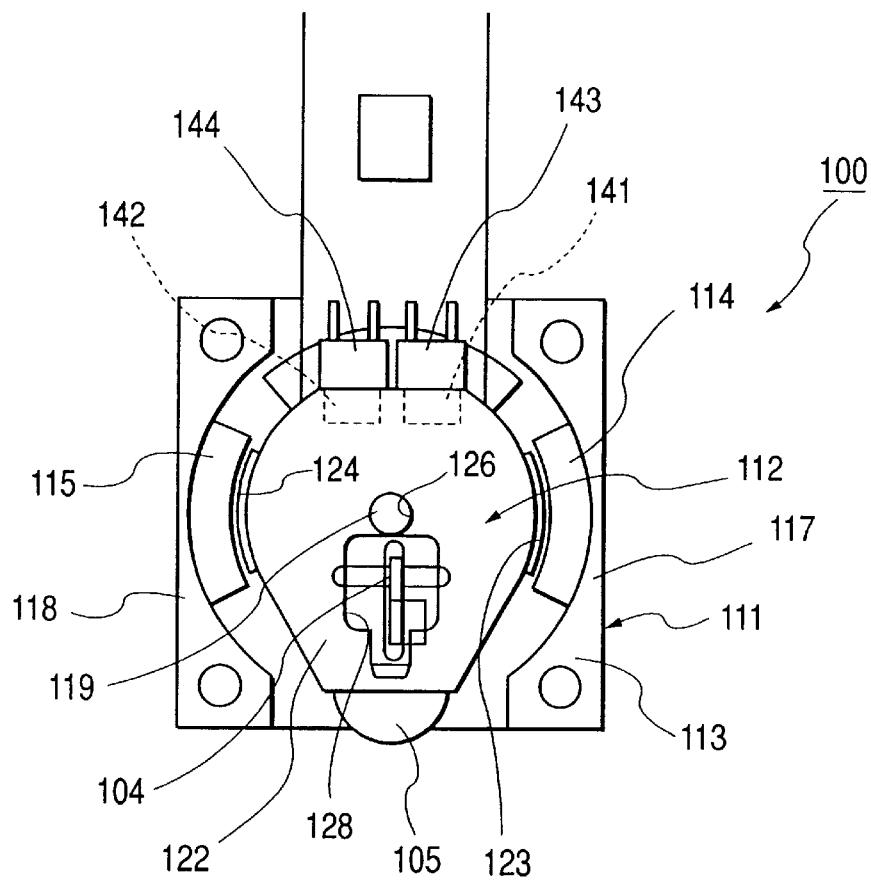
FIG. 6(A) is a plan view of the light beam scanning device of FIG. 5.
Figure 6B:
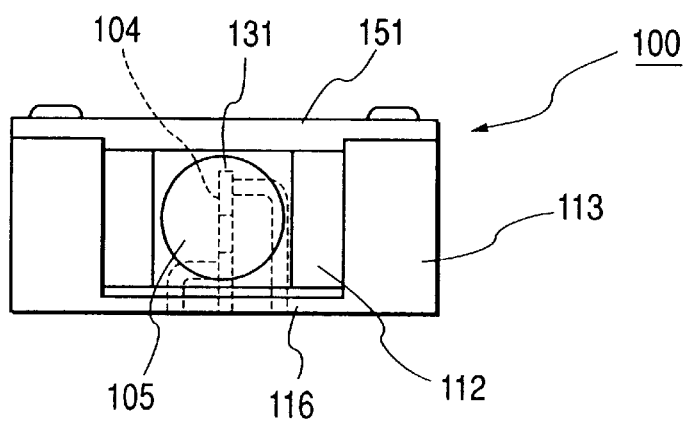
FIG. 6(B) is a front view of the device.
Figure 7A:
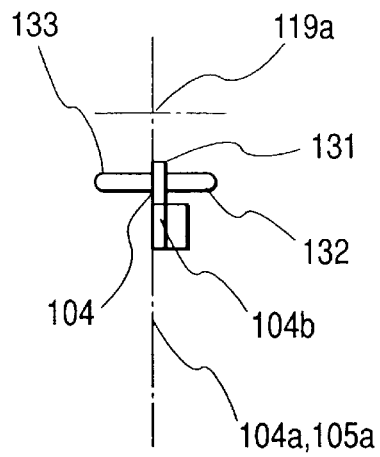
FIG. 7 (A–C) shows a plan view (A), a front view (B), and a side view (C) each detachedly illustrating a chip mounting portion for a semiconductor laser chip in the light beam scanning device of FIG. 5.
Figure 7B:
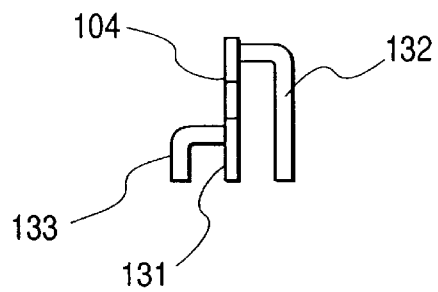
Figure 7C:
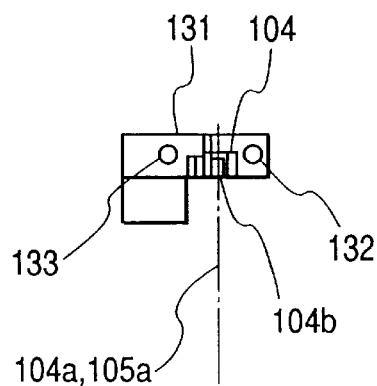

FIGS. 6(A) and 6(B) are a plan view and a front view of the light beam scanning device 100, respectively, and FIG. 7 shows a plan view, a front view, and a side view each detachedly illustrating a mounting portion for the semiconductor laser chip.

The embodiment will be described with reference to FIGS. 6 and 7 also. A swinging mechanism 106 of the light beam scanning device 100 comprises a stator 111 and a rotor 112, and is a called magnetic driving mechanism of a so-called periphery opposed type in which a magnetic driving circuit is configured between the outer peripheral face of the rotor 112 and the inner peripheral face of the stator 111 that is opposed to the outer peripheral face. The mechanism will be described in more detail.

The stator 111 comprises a yoke portion 113, and a pair of driving magnets 114 and 115. The yoke portion 113 comprises a rectangular bottom plate portion 116, and side wall portions 117 and 118 which vertically rise from the right and left edges of the bottom plate portion, and has a shape which is opened in the forward and rearward directions. The inner side faces of the side wall portions 117 and 118 are formed as the inner peripheral face which is arcuate. The magnets 114 and 115 for driving the rotor are attached to the inner side faces in a laterally symmetrical manner. A swing center shaft 119 vertical protrudes from the bottom plate portion 116 where the center of the arcuate inner peripheral face formed on the side wall portions 117 and 118 is positioned.

The rotor 112 comprises a lens holding member 122, and a pair of driving coils 123 and 124. At the center of the lens holding member 122, formed is a center shaft hole 126 which rotatably receives the swing center shaft 119. The right and left side faces of the member are formed as arcuate outer peripheral faces corresponding to the inner peripheral face of the stator. The driving coils 123 and 124 are attached to the arcuate outer peripheral faces, respectively. Therefore, the driving coils 123 and 124 are opposed to the driving magnets 114 and 115 on the stator, via a small gap. When the driving coils 123 and 124 are energized, the rotor 112 is swung by a magnetic action among the coils and the driving magnets 114 and 115.

The front face of the lens holding member 122 is a face which is perpendicular to the bottom plate portion 116. The collimating lens 105 is attached to the front face with being directed in the forward direction in which the light beam is emitted. In the embodiment, the optical axis 105a of the collimating lens 105 is set so as to contain a straight line which passes the center 19a of the swing center shaft 119, and forward elongate in a horizontal direction.

A rectangular opening 128 is formed between the center shaft hole 126 of the lens holding member 122 and the portion to which the collimating lens 105 is attached, so as to vertically pass through the member. The rear end face of the collimating lens 105 is exposed through the front side of the opening 128. The semiconductor laser chip 104 is placed inside the opening 128.

As shown in FIG. 7, the semiconductor laser chip 104 is mounted on a support substrate 131 which is perpendicularly attached to the bottom plate portion 116 of the yoke plate. Terminal pins 132 and 133 elongate from the right and left side faces of the support substrate 131, respectively.

In the embodiment, the luminescent point 104b of the semiconductor laser chip 104 is positioned in the same horizontal plane as the optical axis 105a of the swung lens 105. The swing center shaft 119 elongates in perpendicular to the horizontal plane. The swing center 119a is positioned at the intersection point of an extension of the main optical axis 104a of the light beam emitted from the luminescent point 104b, and that of the lens optical axis 105a. The luminescent point 104b is positioned between the swing center shaft 119 and the lens 105.

As shown in FIG. 6(B), a rectangular cover 151 is attached to the upper end of the yoke plate 113 so as to close the upper opening of the plate. In FIGS. 5 and 6(A), the cover 151 is omitted.

In the thus configured light beam scanning device 100, when the energization direction of the pair of driving coils 123 and 124 is controlled, the rotor 112 can be laterally swung in the predetermined angle range by an action among the coils and the driving magnets 114 and 115. The magnetic driving action is identical with that in a correction operation on the tracking direction in an objective lens driving mechanism which is used in an optical pickup and which is of a so-called shaft sliding type. The driving coils 123 and 124 and the driving magnets 114 and 115 can be configured in the same manner as those used for a tracking operation in an objective lens driving mechanism which is known in the prior art. Therefore, their detailed description is omitted.

When the rotor 112 is swung as described above, also the collimating lens 105 attached to the front face of the rotor is laterally swung at the same time. When the semiconductor laser chip 104 emits light, the laser light from the chip enters the collimating lens 105 and is then emitted therefrom as a laser beam. Namely, the laser beam is laterally swung in accordance with the swinging movement of the lens 105, and therefore laterally scans the measuring object region in front of the device. In the same manner as the embodiment described above, the semiconductor laser chip 104 is driven so as to intermittently emit laser light, thereby attaining the synchronization between the light emission timing (irradiation timing) and the rotational angle position (scanning angle) of the collimating lens 105.

The means for detecting the rotational angle position of the rotor 102, i.e., the collimating lens 105 in the light beam scanning device 100 of the embodiment may be configured in the following manner. Referring to FIG. 6(A), a pair of reflecting faces 141 and 142 are formed on the rear face of the rear end of the lens holding member 122. Reflection type light sensors 143 and 144 are placed on the bottom plate portion 116 of the yoke plate so as to be opposed to the reflecting faces 141 and 142.

Each of the light sensors 143 and 144 comprises a light emitting element such as an LED, and a light receiving element which receives reflection light from the reflecting faces 141 and 142.

The positions of the light receiving faces and the positional relationships between the light receiving faces and the reflecting faces are defined so that the light sensors 143 and 144 exhibit exact opposite output characteristics when the sensors are laterally rotated with respect to the neutral position (origin position) of FIG. 6 at which the lens 105 is directed in the forward direction. Therefore, the rotational angle position of the lens 105 can be obtained on the basis of outputs of the light sensors. Based on the rotational angle position, the light emitting timing of the semiconductor laser chip can be feedback controlled.

Alternatively, only a single light sensor may be used. When two light sensors are used so as to obtain a difference between the outputs of the two sensors as in the case of the embodiment, the temperature characteristics and the like of the sensors can be compensated, and hence a highly accurate control can be realized.

In the same manner as the first embodiment, also the thus configured light beam scanning device of the embodiment can attain an effect that the device can be compactly configured in a small size.

Also in the thus configured light beam scanning device of the embodiment, the mechanism which detects the rotational angle position of the lens 105 is provided, and hence the light emitting timing of the semiconductor laser chip can be feedback controlled, thereby attaining another effect that the synchronization between the light emission timing and the scanning angle of the lens 105 is prevented from being lost.

In the embodiment, furthermore, the luminescent point 104b of the semiconductor laser chip is positioned on the side of the lens with respect to the swing center 119 of the lens 105. As a result, the deflection angle (scanning angle) of the laser beam which is emitted through the lens is larger than the rotational angle of the lens. Therefore, there arises an advantage that the swing angle of the lens required for scanning a target region can be reduced.

As described above, in the light beam scanning device of the invention, the collimating lens is placed in front of the light source placed at a fixed position in the emission direction, and the collimating lens is directly swung in a constant angle range. According to the invention, therefore, a reflector plate or a polygon mirror which is required in the prior art is not necessary, and hence the device can be compactly configured in a very small size.

The light source is placed at or in the vicinity of the swing center of the swinging mechanism and the lens which is driven by the mechanism. As compared with the configuration of the prior art in which a light source is placed outside a swing locus of a swinging mechanism having a reflector plate or a polygon mirror, therefore, the space required for placing such components can be reduced, and hence the whole of the device can be compactly configured in a further small size.

What is claimed is:

1. A light beam scanning device for scaning an object region in a predetermined direction with a light beam, comprising:
    a light source emitting the light beam;
    a collimating lens through which the light beam from said light source is allowed to pass; and
    a swinging mechanism swinging said collimating lens in a predetermined angle range,
    wherein a main optical axis of the light beam from said light source is positioned in a same plane as an optical axis of said collimating lens obtains when said collimating lens is swung, a swing center axis of said collimating lens due to said swinging mechanism is positioned on an extension of an optical axis of the light beam which is on a side of said light source with respect to said collimating lens, and said collimating lens is swung along the plane by said swinging mechanism.

2. A light beam scanning device according to claim 1, further comprising:
    position detecting means for detecting a swing position of said collimating lens; and
    controlling means for, based on a result of the detection of said position detecting means, controlling the swinging movement of said collimating lens by said swinging mechanism.

3. A light beam scanning device according to claim 2, wherein said light source emits a laser beam, and said device further comprising:
    pulse controlling means for, based on the result of the detection of said position detecting means, controlling pulse light emission of the laser beam.

4. A light beam scanning device according to claim 1, wherein said swinging mechanism includes:
    a lens support unit which supports said collimating lens; and
    a magnetic driving mechanism for swinging said lens support unit about the swing center axis.

5. A light beam scanning device according to claim 4, wherein said magnetic driving mechanism includes:

a stator; and a rotor which is swung by said stator and which has said lens support unit; one of magnet and a driving coil is attached to said stator, the other of magnet and said driving coil is attached to said rotor, and said magnet and said driving coil are opposed to each other in a direction of the swing center axis of said collimating lens.

6. A light beam scanning device according to claim 4, wherein said magnetic driving mechanism includes:

a stator having a driving coil;

a rotor on which said lens support unit is mounted, said rotor having a driving magnet, and swung by said stator;

position detecting means for detecting a swing position of said rotor; and speed controlling means for controlling a speed of said rotor.

7. A light beam scanning device according to claim 6, wherein said position detecting means includes a Hall element opposed to a magnetized face of said rotor magnet and detecting an origin position of said rotor, and wherein said speed controlling means includes a frequency generating magnetized face which is formed in an outer peripheral face of said rotor and a magnetic detecting element which is opposed to said frequency generating magnetized face.

8. A light beam scanning device according to claim 4, wherein said magnetic driving mechanism includes:

a rotor to which one of driving magnet and driving coil is attached, and which has said lens support unit;

a stator to which the other of magnet and driving coil is attached, wherein said magnet and said driving coil are opposed to each other in a direction perpendicular to the swing center axis of said collimating lens.

9. A light beam scanning device according to claim 8, said magnet is attached to said stator, said driving coil is attached to said rotor, and said rotor is swingably held on the swing center axis.

10. A light beam scanning device according to claim 9, further comprising:

position detecting means for detecting a swing position of said rotor which is disposed between a part of said lens support unit and said stator, said part of said lens support unit being opposite to an emission direction of the light beam with respect to the swing center axis.

11. A light beam scanning device comprising:

a light source emitting a light beam;

a collimating lens through which the light beam from said light source is allowed to pass and which emits the light beam in a predetermined direction;

a rotating mechanism reciprocally rotating said collimating lens about a rotation axis in a constant angle range; and a horizontal plane containing a locus obtained along an optical axis of said collimating lens when said collimating lens is reciprocally rotated by said rotating mechanism, wherein said horizontal plane contains a main optical axis of the light beam elongating from said light source to said collimating lens, and said rotation axis perpendicularly crosses an extension of the main optical axis of the light beam elongating from said light source to said collimating lens.

12. A light beam scanning device according to claim 11, wherein said light source is disposed on said rotation axis.

13. A light beam scanning device according to claim 11, wherein said light source is disposed between said rotation axis and said collimating lens.

14. A light beam scanning device according to claim 11, wherein said rotating mechanism includes a stator having a light source support unit which supports said light source and a rotor having a lens support unit which supports said collimating lens.

15. A light beam scanning device according to claim 14, wherein said rotating mechanism includes a driving magnet which is attached to one of said stator and said rotor and a driving coil which is attached to the other of said stator and said rotor, wherein said driving coil is opposed to said driving magnet.

16. A light beam scanning device according to claim 11, further comprising:

position detecting means for detecting a rotation position of said collimating lens; and controlling means for, based on a result of the detection of said position detecting means, controlling the rotating movement of said collimating lens by said rotating mechanism.

* * * * *